United States Patent [19]
Fraser

[11] Patent Number: 5,835,580
[45] Date of Patent: Nov. 10, 1998

[54] METHOD AND APPARATUS FOR AUTOMATED PROVISIONING AND BILLING OF COMMUNICATION SERVICES

[75] Inventor: Alexander Gibson Fraser, Bernardsville, N.J.

[73] Assignee: AT&T Corp, Middletown, N.J.

[21] Appl. No.: 627,660

[22] Filed: Apr. 4, 1996

[51] Int. Cl.⁶ .................................................. H04M 15/00
[52] U.S. Cl. .................. 379/115; 379/91.01; 379/92.04; 379/111; 379/121; 379/242
[58] Field of Search .................................... 379/111, 112, 379/113, 114, 115, 117, 118, 120, 126, 127, 106, 133, 134, 140, 188, 191, 196, 197, 201, 218, 230, 242, 295, 246, 207, 350, 352, 240, 91.01, 92.02; 455/432, 433, 435, 411

[56] References Cited

U.S. PATENT DOCUMENTS

| | | | |
|---|---|---|---|
| 4,775,997 | 10/1988 | West, Jr. et al. | 379/58 |
| 4,787,082 | 11/1988 | Delaney et al. | 370/85 |
| 5,003,584 | 3/1991 | Benyacar et al. | 379/119 |
| 5,136,584 | 8/1992 | Hedlund | 370/94.1 |
| 5,185,785 | 2/1993 | Funk et al. | 379/111 |
| 5,251,248 | 10/1993 | Tokunaga et al. | 455/411 |
| 5,309,432 | 5/1994 | Kanakia | 370/60 |
| 5,347,304 | 9/1994 | Moura et al. | 348/12 |
| 5,355,405 | 10/1994 | Bernstein | 379/246 |
| 5,406,583 | 4/1995 | Dagdeviren | 375/5 |
| 5,426,421 | 6/1995 | Gray | 340/825.15 |
| 5,487,107 | 1/1996 | Atkins et al. | 379/114 |
| 5,517,559 | 5/1996 | Hayashi et al. | 379/115 |
| 5,528,675 | 6/1996 | Chen | 379/106 |
| 5,588,051 | 12/1996 | Berkowitz et al. | 379/188 |

FOREIGN PATENT DOCUMENTS

| | | | |
|---|---|---|---|
| 0 618 745 A | 10/1994 | European Pat. Off. | H04Q 7/04 |
| WO 93/18606 | 9/1993 | WIPO | H04M 11/00 |
| WO 95/22230 | 8/1995 | WIPO . | |

OTHER PUBLICATIONS

AT&T Corp., AT&T ExpressRoute Digital Adapter 1000/2000, Release 6.0, Technical Reference, Issue 3, Mar. 1995, pp. 1–1 through 1–3; 1–9; 2–1 through 2–3; 2 unnumbered pages. Technological background of the invention.

D. R. Coffield et al., "The Leading Edge in High–Speed Data Communications Services: The InterSpan(R) Asynchronous Transfer Mode Service," AT&T Technical Journal, Jul./Aug. 1995, pp. 38–49. Technological background of the invention.

G.–H. Im et al., "51.84 Mb/s 16–CAP ATM LAN Standard," IEEE Journal on Selected Areas in Communications, vol. 13, No. 4, May 1995, pp. 620–632. Technological background of the invention.

J. Sundborg, "Universal Personal Telecommunication (UPT)—Concept and Standardisation," *Ericsson Review*, No. 4, 1993, pp. 140–155. Comment: Technological background of the invention.

*Primary Examiner*—Paul Loomis
*Assistant Examiner*—Binh K. Tieu

[57] ABSTRACT

A method for operating a communication network where the tie between the provisioning of and billing for service and the terminating point of the telecommunication network to which service is provided is severed. Instead, an association is maintained between the provisioning and billing for service and a piece of telecommunication equipment, regardless of the point of that equipment's connection to the network. This enables a customer to appear at any point of the telecommunication network and still obtain service, and it allows the telecommunication carrier to streamline the processes of provisioning, billing and collecting of moneys. An account is maintained by the telecommunication carrier for a specific piece of telecommunication equipment. The account is established by forwarding to the telecommunication carrier a service request including information that uniquely identifies the telecommunication equipment and information that enables the carrier to bill the customer. The carrier optionally establishes a relationship with a credit card enterprise to pay for services rendered to the registered equipment.

14 Claims, 2 Drawing Sheets

METHOD AND APPARATUS FOR AUTOMATED PROVISIONING AND BILLING OF COMMUNICATION SERVICES

CROSS REFERENCE TO RELATED APPLICATION

Related subject matter is disclosed in the following applications filed concurrently herewith and assigned to the same Assignee thereof: U.S. patent application Ser. No. 08/627,661 entitled "A Customer Telecommunication Interface Device Having A Unique Identifier;" U.S. patent application Ser. No. 08/627,659, entitled "Packet Telephone System;" U.S. patent application Ser. No. 08/627,657, entitled "A Customer Telecommunication Interface Device With Built-In Network Features;" and U.S. patent application Ser. No. 08/627,658, entitled "A Packet Format For Telecommunication Instruments."

BACKGROUND OF THE INVENTION

This invention relates to provisioning and billing of communication services.

Currently in the US, the provisioning and billing of communication services typically involves the customer contacting a desired communication carrier that provides local service and establishing an account for basic and, perhaps, enhanced services. The carrier enables a telephone line on premises specified by the customer, the customer attaches telephone equipment to that line, and service is thus provided to the equipment. Thereafter, the customer is periodically billed for the services that are provided.

While the provisioning and billing procedures have been improved by automation, communication systems are continually attempting to further enhance the automation of these procedures.

SUMMARY OF THE INVENTION

An advance in the art is achieved by severing the tie between the provisioning of and billing for service and the terminating point of the telecommunication network to which service is provided. Instead, an association is maintained between the provisioning and billing for service and a piece of telecommunication equipment, regardless of the point of that equipment's connection to the network. This novel approach enables a customer to appear at any point of the telecommunication network and still obtain service, and it allows the telecommunication carrier to streamline the processes of provisioning, billing and collecting of moneys. An account is maintained by the telecommunications carrier for a specific piece of telecommunication equipment. The account is established by forwarding to the telecommunication carrier a service request including information that uniquely identifies the telecommunication equipment and information that enables the carrier to bill the customer. This, in effect, is a registration process. Thereafter, when the telecommunication carrier's apparatus detects a connection of the purchased communication equipment to one of its network terminating points, it associates the line with the registered equipment and makes arrangements to provide service to the identified communication line. The customer is then billed for services in the manner, for example, that all charge card billing is done. Of course, accounts for a plurality of pieces of equipment that are tied to a single credit card number are coalesced into a single bill.

DETAILED DESCRIPTION

The heart of the disclosure is the notion that provisioning and billing is associated with equipment that is connected to the telecommunication network, and not with a particular terminating node of the network. That suggests that each individual piece of equipment that is connected to the network is uniquely identifiable. That is accomplished, for example, with equipment constructed in accordance with a disclosure contained in the above-mentioned patent application titled "A Customer Telecommunication Interface Device Having a Unique Identifier."

Figure 1:
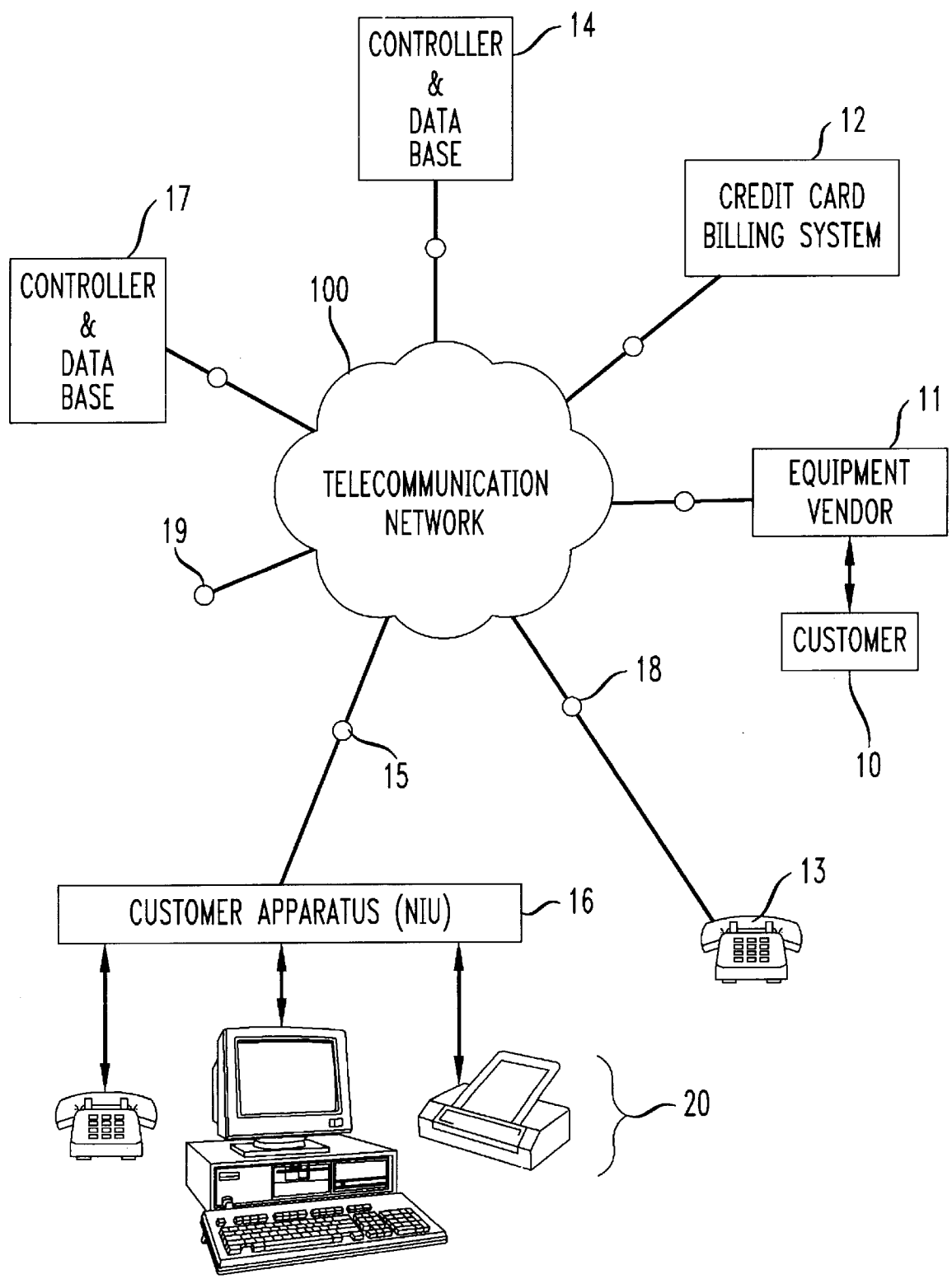
FIG. 1 illustrates typical interconnections between a communication system, a credit card system, and a vendor system which is useful in describing the operation of the present invention.

FIG. 1 presents an illustrative embodiment, in block diagram form, of an arrangement adapted for practicing the invention disclosed herein. Element 100 is a telecommunication network that may be structured, for example, like the network described in the above-mentioned copending application titled "Packet Telephone System." Such a network, for example, can have terminating points 15, 18, 19 that are always active, in the sense that a communication apparatus connected to such a terminating point can communicate with other terminating points of the network, e.g., with credit card system 12, under conditions specified by the carrier that owns network 100.

Elements 13 and 16 in FIG. 1 are network interface units, which may be similar to the ones described in the above-mentioned application titled "A Customer Telecommunication Interface Device Having A Unique Identifier." Unit 13 is basically a telephone that contains a unique ID which can be communicated to network 100 via terminating point 18, and unit 16 is a multi-output unit that is adapted to connect any one of a number of customer units 20 to the network through terminating point 15. As described in the above-mentioned applications, a telecommunications network 100 that is packet-based can allow more than one of the customer units 20 to simultaneously communicate through terminating point 15.

Credit card billing system 12 is a conventional system. It typically is an enterprise connected to network 100 that is accessed by merchants who wish the enterprise to assume a debt of the merchant's customer. The assumption of debt is made, typically, by the enterprise communicating to the merchant (through network 100) an authorization to extend credit to the customer. Vendor 11 may be such a merchant, perhaps one who sells to customers (e.g., 10) telecommunication equipment such as network interface units 16 and 13.

It should be understood, of course, that network 100 may also be a cable TV system, a local area network, Internet, or any other type of wired or wireless communication system suitable for carrying communication services.

Figure 2:
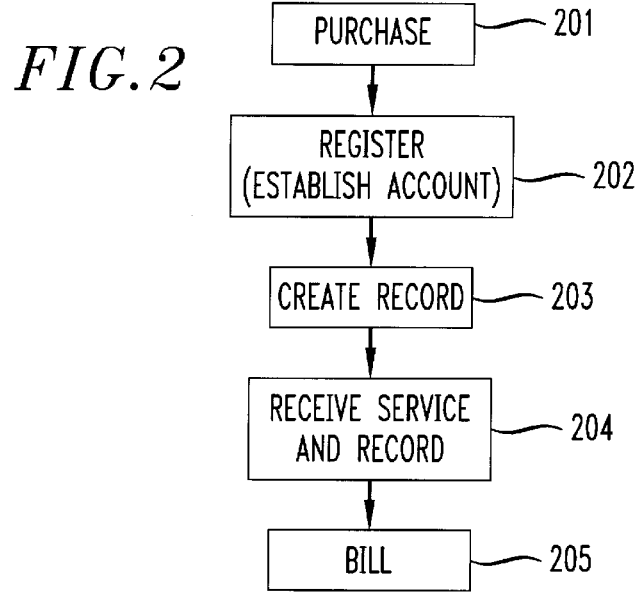
FIG. 2 presents a flow diagram of the operational process disclosed herein.

FIG. 2 describes the basic steps carried out by the method disclosed herein. First, the customer purchases a piece of network interface (NIU) equipment from, for example, vendor 11 (step 201). The NIU includes a unique identifier. The next step is to register the purchased equipment with the carrier of network 100 (step 202).

When the purchaser does not have an account with the carrier which owns network 100 (and with no other carrier), the first order of business in the registration process is to establish such an account. The account can be optionally established at the vendor's premises (for the convenience of the customer) or at any other terminating point of the network, such as at the customer's home. Whichever option is used, the carrier is contacted at a known telephone number, that is, communication is established with database system 14, and the process of registering and establishing an account commences. The specifics of this process are, of course, up to individual carriers. It is contemplated, however, that carriers will use the conventional credit card billing enterprise (e.g., AT&T's Universal Card Services) to vouch for and effectively assume the future debts of the customer. This, by the way, is a departure from current credit card systems which vouch for and assume existing, ascertained, and (when the amount is large enough) pre-authorized debts.

Such enterprises typically request information from the customer before they authorize merchants to extend credit, and the same applies to the instant registration/account-establishment process. Illustratively, the customer is requested to supply to the carrier the customer's name, credit card number, and whatever other information is desired by the credit card system to agree to assume charges for future telecommunication services (typically, expiration date of the card and mother's maiden name). Of course, other techniques can be employed such as requesting the customer to speak a selected phrase (and compare the voice print of the spoken phrase to a previously stored voice print). The information provided by the customer to the carrier is then communicated to credit card billing system 12, and the billing system determines whether the customer is bona fide.

When the customer already has an account with the carrier, the very same authentication process can take place. Alternatively, the carrier can implement its own customer authentication test, assuming that the credit card billing system still recognizes and assumes debts of the customer. The carrier's own authentication test may, for example, be storing the data given to the credit card billing system at the account establishment stage, and comparing the stored data with the current data supplied by the customer.

Figure 3:
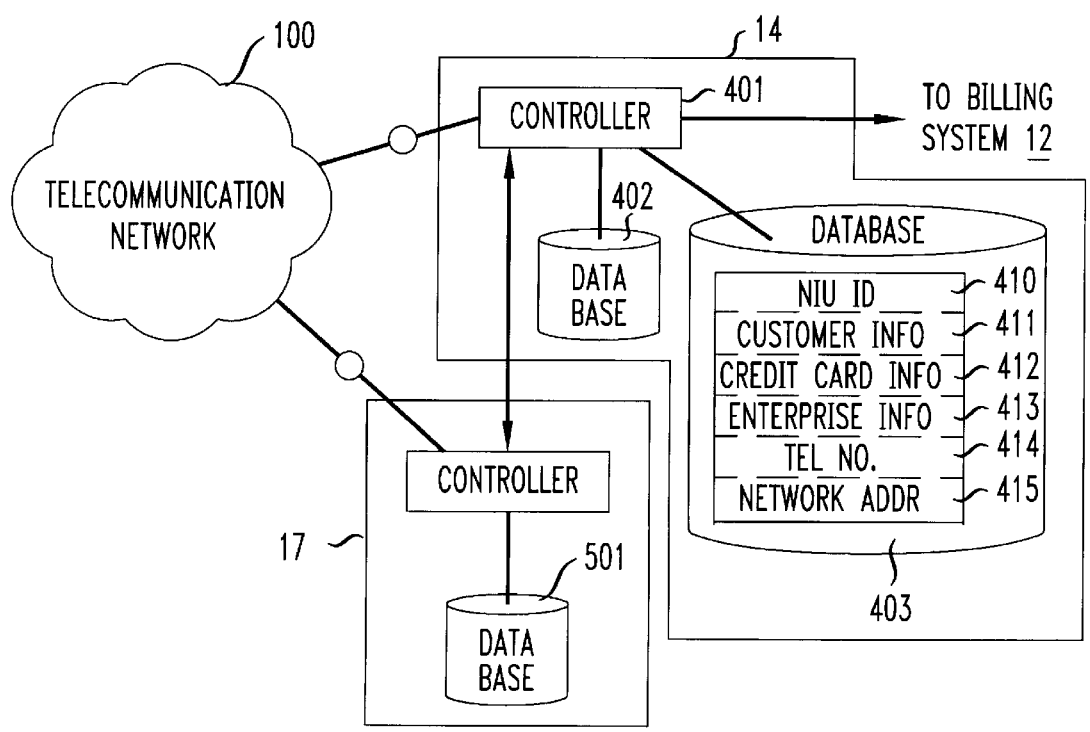
FIG. 3 shows one embodiment of database systems employed by the communication system in order to effect the principles disclosed herein.

FIG. 3 depicts the carrier's registration/provisioning system 14 and billing system 17. System 14 comprises controller 401 and database 402. Controller 401 includes components for communicating with network 100 and with credit card billing system 12 (directly, or through network 100), and components for dealing with databases 402 and 403. Database 402 includes a record for each piece of registered equipment. Database 403 maintains a record of the charges accumulated for each piece of equipment. System 17 contains database 501 which is coupled to database 402 and to network 100. Database 501 is basically a translation table that associates a phone number with a terminating point in network 100.

When the customer is determined to be bona fide, the next step is to establish an entry, or record, in database 402 (step 203 of FIG. 2). The record, which belongs to a particular network interface unit (NIU), obviously includes an NIU ID field (410). It also includes a customer information field 411, a credit card information field 412, a credit card enterprise information field 413 (if necessary), a telephone number field 414, and a network interface address field 415.

Information for fields 410, 411, 412, and 414 is obtained in the course of the registration process. When the registration process is carried out in the customer's home, the network interface address field (415) contains the identity of the terminating point of network 100 that is located in the customer's home. When the registration process is carried out at the vendor's premises, it is possible for the carrier to leave field 415 blank, or to allow entry of the vendor's terminating point.

In the course of registration, a determination is made by controller 401 as to whether the process effectively seeks to establish a new account; i.e., the customer wishes to have a new telephone number assigned. In such a case, a new telephone number is assigned, stored in field 414, and communicated to the customer. When it is determined that the customer is merely buying another NIU which, perhaps, is a replacement for a previously registered NIU, then the telephone number of the customer is retrieved from another record within database 402 and stored in field 414 of the newly established record. Of course, if the customer has more than one NIU and those NIUs are associated with the same telephone number, and more than one of them is connected to network 100, a process must be established by the carrier as to which NIU is accessed when a call is directed to that telephone number. The process may simply be: direct the call to the terminating point last used by an NIU having that telephone number.

The association of telephone numbers and the network interface addresses (the terminating points of network 100) is replicated in database 501. This database is accessed whenever communication services are provided to translate between telephone numbers and network interface addresses.

When services are provided for which billing information is to be recorded (step 204 in FIG. 2), system 17 communicates the appropriate information to billing database 403. The service provision information is correlated with information in database 402 to form billing information that is stored in database 403. The billing information contains, for example, the telephone number, the NIU that incurred the charge, the amount of the charge (or perhaps just a record of the amount of service provided), and the credit card number. At whatever rate desired, the billing information is communicated to credit card billing system 12 (step 205 in FIG. 2) and, in turn, billing system 12 pays the carrier, bills the customer, and collects payment from the customer. The billing can be in accordance with current practices, such as specifying all calls to destinations that incurred extra charges, or it may be simply an indication of the number of minutes of service that were provided.

In accordance with the above-mentioned copending applications, a customer's NIU reports to the system (through signals flowing through the terminating point of the network to which the NIU is connected) of its presence in the network. This reporting is done by the NIU of its own volition or in response to a polling signal. Whenever the NIU so reports, database 402 is consulted. If the network interface address (NIA) of that particular NIU is different from that which is in database 402, a conclusion is reached that the NIU was transported to a new location. Accordingly, databases 402 and 501 are modified to reflect the change in location.

It should be realized that the above specific embodiments disclosed are merely illustrative embodiments, and that other modifications to the arrangements and methods can be made without departing from the scope of the invention disclosed herein. For example, although telephone numbers have been mentioned above, it is quite reasonable to establish an arrangement where the a customer has a "handle" that is not a number. Also, the request the registration request can include information pertaining to the specific type of service that the customer wishes to obtain via the purchased apparatus.

A concern that is always present in telecommunication networks is fraud. In the case of provisioning, there is the issue of someone installing an NIU that has an ID which is recognized as one that belongs to a bona fide customer. If that customer's NIU is still connected to the network, then the network has two NIUs with the same ID. That is a clear indication of a problem, and the owner of the telecommunication network can easily refuse to grant service to the later-connected NIU. On the other hand, portability of NIUs is a hallmark of the disclosed arrangement, and the owner of the telecommunication network should include processes that allow the network address of the NIU to be changed. To reduce the chances for fraud, the process may advantageously include a transition time interval. When a particular NIU is determined to have been disconnected from the network, it can be reconnected to the network within a preselected number of days with no need for re-registration. After the preselected number of days, the NIU must be registered anew.

I claim:

1. A method for operating a communication system to enable a customer to receive service from said communication system, comprising the steps of;

forwarding to the communication system a request to initially register a communication apparatus connected to a terminating point of the communication system, which request includes in formation that uniquely identifies the communication apparatus through a network identification unit ID, and information to allow billing for services rendered to the apparatus (billing information);

authenticating the request to initially register, establishing a database record to associate the NIU ID, the billing information, a customer identifier, and the terminating point of said communication system to which the apparatus is connected; and polling the terminating point of said communication system to determine whether an apparatus connected to said terminating point possesses said NIU ID and modifying said database when the polled terminating point does not have the apparatus that possesses said NIU ID.

2. The method of claim 1, further comprising the steps of:

providing communication service to said apparatus via said terminating point;

recording in billing records charges information pertaining to said provision of service, and forming a request for payment, said request including said NIU ID and said charges information.

3. The method of claim 2 wherein said billing information includes credit card information and validation information, and said step of authenticating includes a step of arranging with a credit card billing enterprise for said enterprise to make payments pursuant to said request for payment.

4. The method of claim 1 wherein the detecting step involves the periodic polling of terminating points of the communication system.

5. The method of claim 1 wherein said request includes information identifying one or more service features desired by the customer.

6. The method of claim 1 wherein the NIU ID is a manufacturer-installed apparatus serial number.

7. The method of claim 1 where in the course of establishing a database record the communication system assigns a customer identifier to the customer.

8. The method of claim 1 where the customer identifier is a telephone number.

9. The method of claim 1 where the step of polling is carried out repetitively.

10. The method of claim 1 where the step of polling is initiated by the communication apparatus.

11. The method of claim 1 where the communication apparatus is customer owned.

12. The method of claim 1 where the communication apparatus is attached to the terminating point by the customer.

13. The method of claim 12 where the step of polling is carried out repetitively to capture occurrences where the customer connects the communication apparatus to a different terminating point of the communication system.

14. A method for operating a communication system to enable a customer to receive service front said communication system via terminating points of said communication system, comprising the steps of:

initially registering a communication apparatus for service by a) forwarding to the communication system a request to register a communication apparatus connected to one of said terminating points of the communication system, which request includes information that uniquely identifies the communication apparatus through a network identification unit ID, and information to allow billing for services rendered to the apparatus, b) authenticating the request to initially register, and c) establishing a database record to associate the NIU ID, the billing information, a customer identifier, and the terminating point in said communication system to which the apparatus is connected;

repetitively determining the terminating point to which said communication apparatus is connected and modifying said database record when the determined terminating point to which said communication is connected is different from the terminating point contained in said record; and providing service to said communication apparatus at the terminating point to which said communication apparatus is connected based on current information found in said record.

* * * * *

UNITED STATES PATENT AND TRADEMARK OFFICE
CERTIFICATE OF CORRECTION

PATENT NO. : 5,835,580
DATED : November 10, 1998
INVENTOR(S) : Alexander Gibson Fraser Page 1 of 1

It is certified that error appears in the above-identified patent and that said Letters Patent is hereby corrected as shown below:

Claim 1,
Line 7, "in formation" should read -- information --
Line 19, after "NIU ID" please insert a -- , --

Signed and Sealed this

Twenty-sixth Day of March, 2002

Attest:

Attesting Officer

JAMES E. ROGAN
Director of the United States Patent and Trademark Office